(12) United States Patent
Sawai

(10) Patent No.: US 7,583,315 B2
(45) Date of Patent: Sep. 1, 2009

(54) IMAGE PICKUP APPARATUS, CAMERA MODULE AND IMAGE PICKUP METHOD HAVING A TRANSMISSION MEMBER WHICH IS SELECTIVELY ENGAGEABLE WITH A SHUTTER GEAR OR A GEAR FORMED ON THE OUTER PERIPHERY OF THE LENS FRAME

(75) Inventor: Toshikazu Sawai, Akiruno (JP)

(73) Assignee: Casio Computer Co., Ltd., Tokyo (JP)

( * ) Notice: Subject to any disclaimer, the term of this patent is extended or adjusted under 35 U.S.C. 154(b) by 907 days.

(21) Appl. No.: 11/053,117

(22) Filed: Feb. 7, 2005

(65) Prior Publication Data

US 2005/0179803 A1 Aug. 18, 2005

(30) Foreign Application Priority Data

Feb. 12, 2004 (JP) ............................. 2004-035123

(51) Int. Cl.
*H04N 5/225* (2006.01)
(52) U.S. Cl. ........................................ 348/374; 348/335
(58) Field of Classification Search ................. 348/335, 348/345, 363, 373–376; 396/132
See application file for complete search history.

(56) References Cited

U.S. PATENT DOCUMENTS 6,026,245 A * 2/2000 Fujii et al. ..................... 396/85
6,370,334 B1 * 4/2002 Ishikawa ..................... 396/132
6,556,789 B2 * 4/2003 Shirie ......................... 396/132
2003/0095797 A1 * 5/2003 Nakata ......................... 396/54
2004/0155976 A1 * 8/2004 Suda ............................ 348/345

FOREIGN PATENT DOCUMENTS

| CN | 1154491 A | 7/1997 |
|---|---|---|
| JP | 59-77418 A | 5/1984 |
| JP | 61-11138 U | 1/1986 |
| JP | 9-230428 A | 9/1997 |

* cited by examiner

*Primary Examiner*—Lin Ye
*Assistant Examiner*—Gevell Selby
(74) *Attorney, Agent, or Firm*—Frishauf, Holtz, Goodman & Chick, P.C.

(57) ABSTRACT

When half depression of a camera key is detected, a narrow pulse voltage is applied to a piezoelectric element such that the AF gear meshes with a gear provided on the lens frame. Then, a wide pulse voltage opposite in polarity is applied to the piezoelectric element such that the AF gear moves away from the gear provided on the lens frame with the AF gear meshing with a drive gear of the AF motor, and then meshes with a shutter gear. Rotation of the drive gear of the AF motor is transmitted to the AF gear and the gear provided on the lens frame while turning the shutter blade.

6 Claims, 8 Drawing Sheets

IMAGE PICKUP APPARATUS, CAMERA
MODULE AND IMAGE PICKUP METHOD
HAVING A TRANSMISSION MEMBER
WHICH IS SELECTIVELY ENGAGEABLE
WITH A SHUTTER GEAR OR A GEAR
FORMED ON THE OUTER PERIPHERY OF
THE LENS FRAME

FIELD OF THE INVENTION

The present invention relates to image pickup apparatus, camera modules and a method of picking up an image of an object using the same.

BACKGROUND ART

In a conventional camera, a lens drive mechanism is used that comprises an AF gear that drives the lens, an AE gear that opens/closes the shutter blade for the lens, a motor for driving these gears and a planetary clutch mechanism that is swung by rotations of the motor in forward and backward directions, thereby selecting the direction of transmitting the driving force of the motor (for example, see Published Unexamined Japanese Patent Application Hei 9-230428).

In this method, however, the AE gear must be disposed at such a position distant from the AF gear that the planetary clutch mechanism can swing. In addition, the lens drive mechanism must comprise an engaging lever that holds the planetary clutch mechanism at a selected one of two positions where the planetary clutch mechanism engages the respective AF and AE gears selectively, a plunger and core that swings the engaging lever, and a lever returning spring. Thus, miniaturization and thinning of the lens drive mechanism are limited.

It is therefore an object of the present invention to provide a miniaturized and thinned image pickup apparatus and camera circuit section in which the AF gear needs to be slightly moved axially to open/close the shutter blade, and a method of picking up an image of an object using the apparatus and camera circuit section.

SUMMARY OF THE INVENTION

In order to achieve the above object, the present invention provides an image pickup apparatus comprising: an image pickup element; a lens for focusing an image of an object onto the image pickup element; a lens moving member for moving the lens; a lens covering member for covering the lens; a covering-member moving member for moving the lens covering member; a driver; a transmission member provided between the lens and the driver for transmitting power from the driver to the lens moving member or the covering-member moving member; and a switching unit for switching the power from the transmission member selectively to one of the lens moving member and the covering-member moving member.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE INVENTION

Figure 1A:
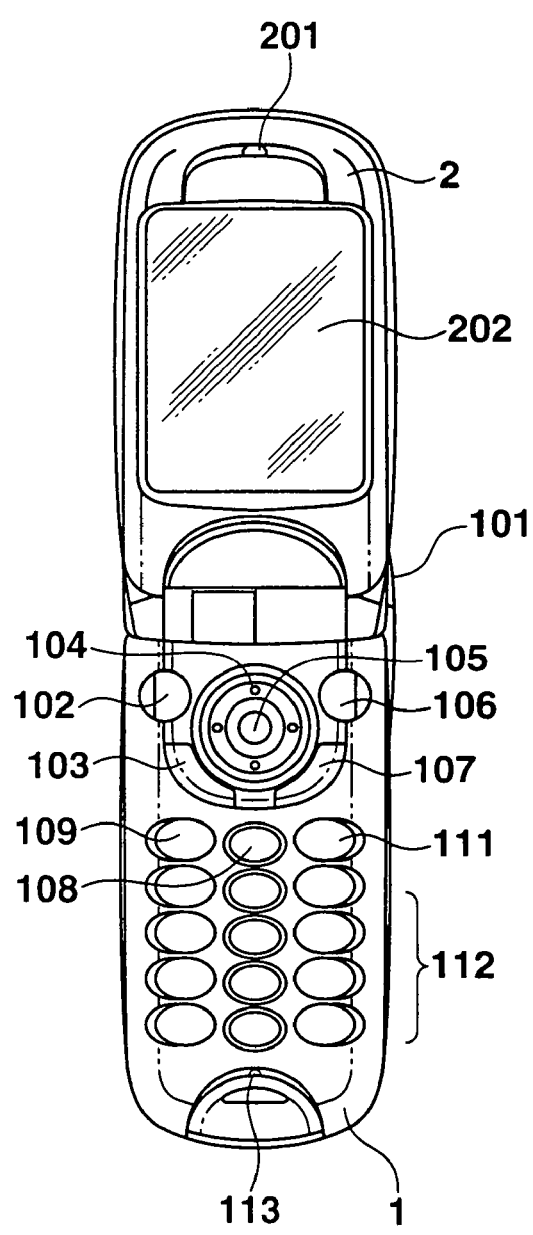
FIG. 1A is a front view of an open folding mobile telephone as one embodiment of the present invention.
Figure 1B:
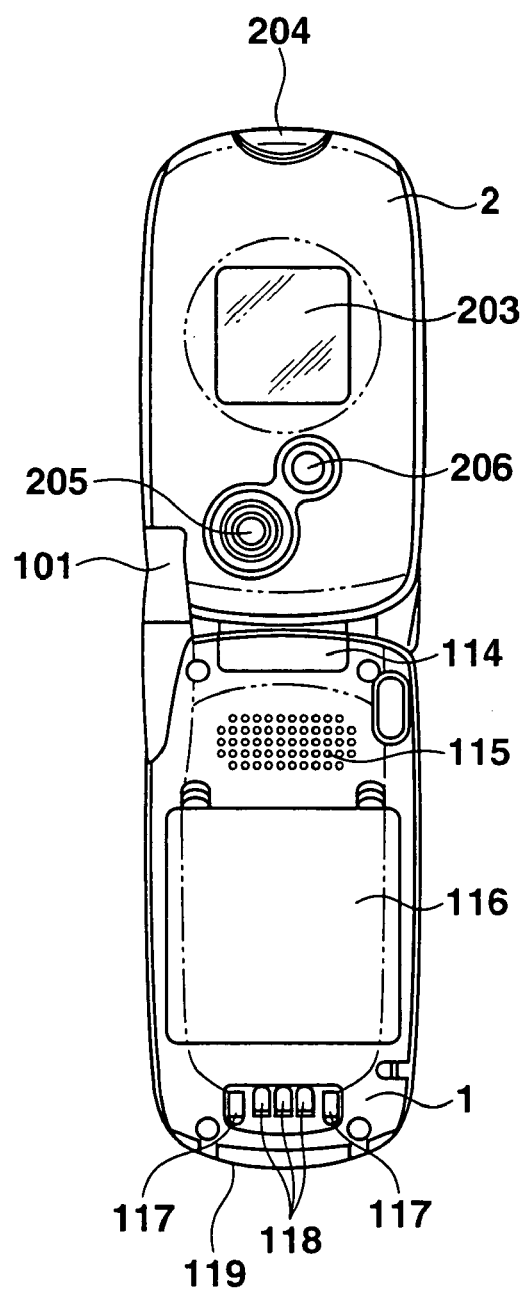
FIG. 1B is a back view of the open folding mobile telephone of FIG. 1A.

Referring to the drawings, an embodiment of the present invention will be described. FIGS. 1A and 1B are a front view and a back view of an open folding mobile telephone according to the present invention. In FIGS. 1A and 1B, reference numerals 1 and 2 denote a body and a cover, respectively, of the mobile telephone.

The body 1 comprises an antenna 101, a camera key 102, a mail key 103, a cross key 104, a decision key 105, an address notebook key 106, a network connection key 107, a clear key 108, an on-hock key 109, an off-hock key 111, a numeral key unit 112, a microphone 113, a card slot cover 114, a notification speaker front 115, a cell pack 116, a pair of charge terminals 117, a USB terminal 118, and a connector cover 119.

Figure 2:
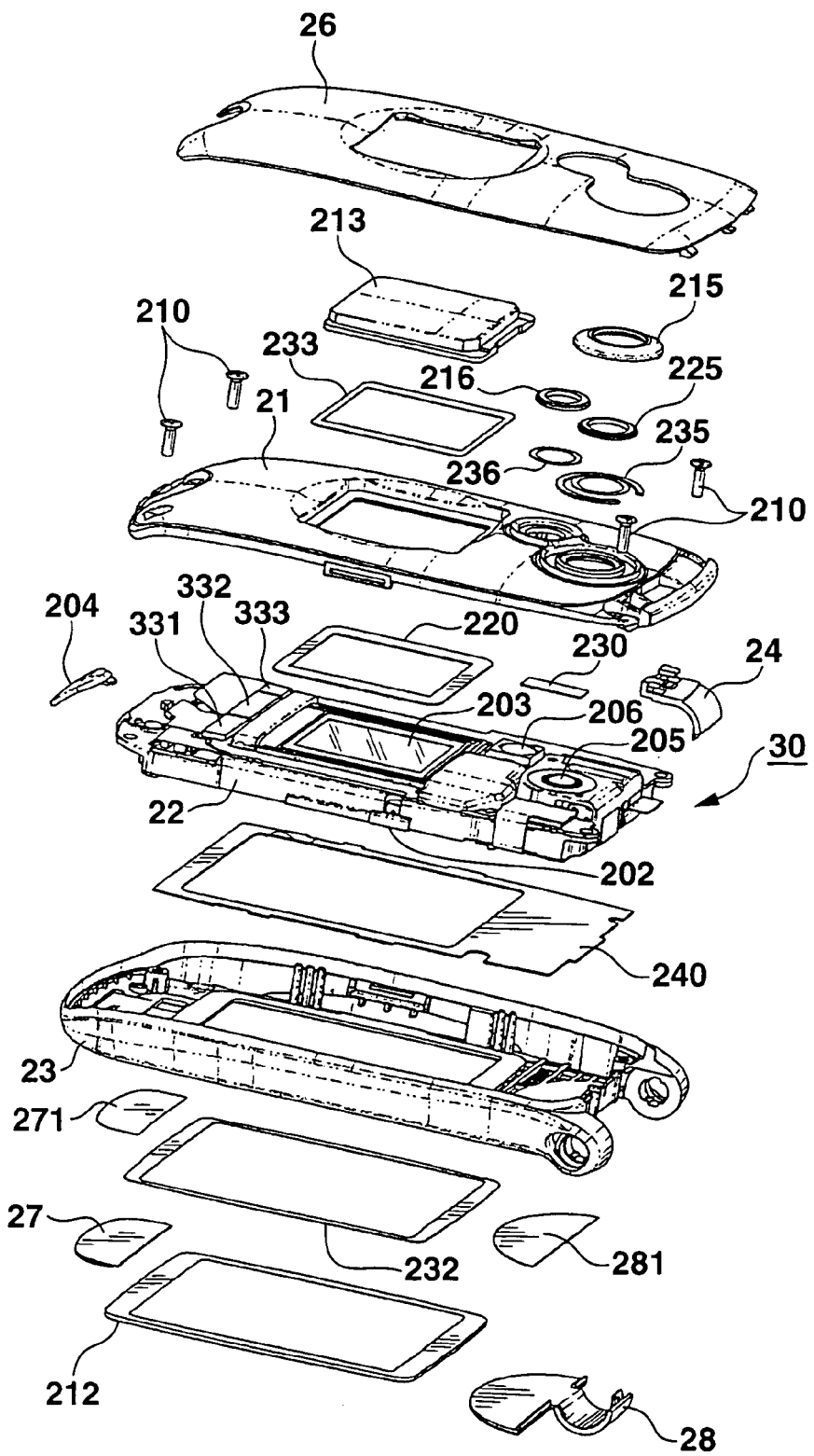
FIG. 2 is an exploded perspective view of a cover of the mobile telephone of FIG. 1 comprising an upper, an internal, a lower case and a decorative panel of the mobile telephone of FIG. 1.

The cover 2 comprises a speaker 201, a main display 202, a sub-display 203, a notification LED 204, an image pickup lens 205, a flash LED 206, etc. As shown in FIG. 2, the cover 2 also comprises a lower case 21, an internal case 22, an upper case 23, a hinge piece 24, a decorative panel 26, a receiver cover 27, and a decorative cover 28.

Figure 3:
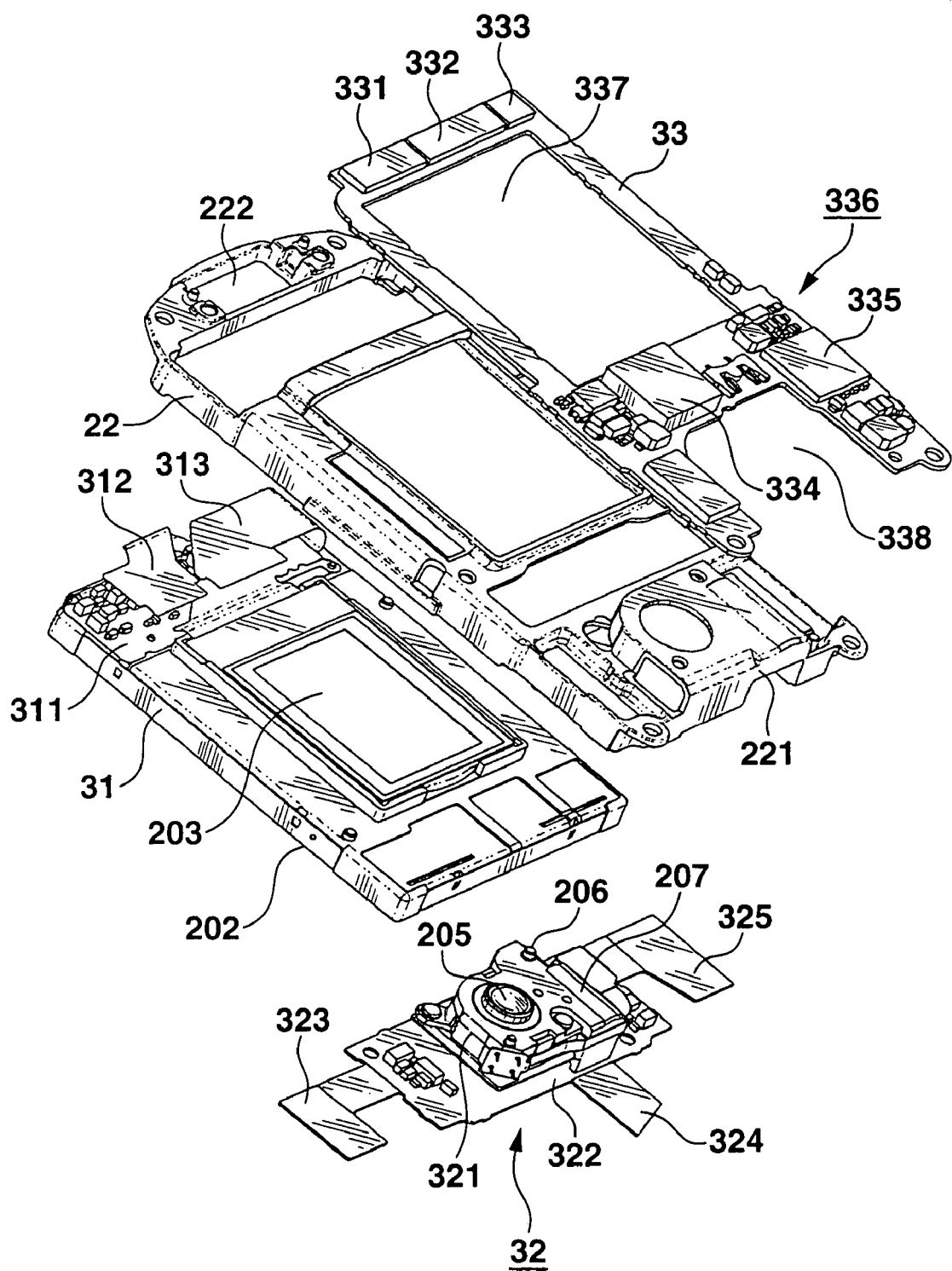
FIG. 3 is an explored perspective view of an internal case assembly of FIG. 2.

In FIG. 2, reference numeral 30 denotes an internal case assembly; 210 case screws; 212 a main display panel; 213 a sub-display panel; 215 a lens cover; 216 an LED cover; 220, 230, 240 a cushion; 225 a lens panel; and 232, 233, 235, 236, 271, 281 a double-faced adhesive. As shown in FIG. 3, the internal case assembly 30 comprises the sub-display 203, a shield case 31, a camera circuit section 32 and a sub-circuit board 33 incorporated into the internal case 22.

A liquid crystal display board (not shown) of the main display 202 is incorporated back to back with a liquid crystal display board 311 of the sub-display 203 within the shield case 31. The shield case 31 is housed fixedly within the internal case 22 with the main and sub-displays 202 and 203 exposed on the front and back, respectively, of the internal case 22.

The internal case 22 has at one end a housing part 221 for the camera circuit section and at the other end an opening 222 through which an incoming-call notification LED unit (not shown) is housed with the sub-display 203 housed within the internal case 22 at substantially a midpoint of the length of the internal case 22.

Figure 4:
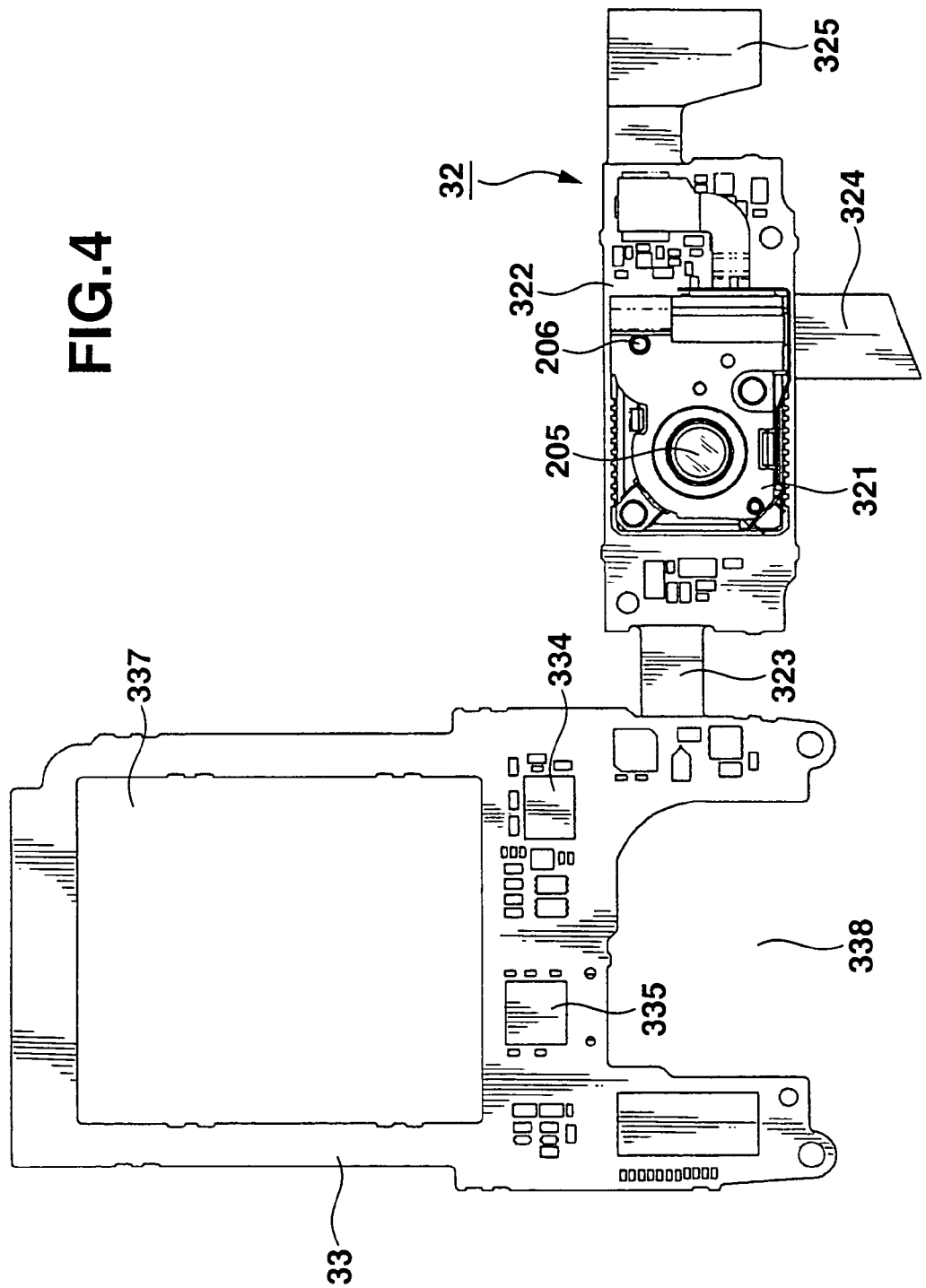
FIG. 4 is a plan view of a camera circuit section and a board of FIG. 3 connected to each other.

The camera circuit section 32 comprises the image pickup lens 205, flash LED 206, and an AF (Auto Focusing) motor 207 housed within a camera module 321 fixed to a circuit board 322 to which FPCs (Flexible Printed Circuits) 323, 324 and 325 are attached, as shown in FIG. 4.

The sub-circuit board 33 is fixed from below the internal case 22 to an opposite surface of the internal case 22 from the shield case 31 with the sub-display 203 disposed within the opening 337. The camera circuit section 32 is disposed within an opening 338 in the sub-circuit board 33 on opposite ends of which a group of liquid crystal drivers 331, 332 and 333 and a group of camera control elements 334 and 335 that compose a camera control circuit 336 are also disposed, respectively.

The liquid crystal drivers 331, 332 and 333 are connected to FPCs 312 and 313 extending from the liquid crystal display board 311.

As shown in FIG. 2, the internal case assembly 30 is fixed with screws 210 between the lower and upper cases 21 and 23 with the decorative panel 26 attached to the lower case 21, thereby completing the cover 2.

A camera module 321 of the camera circuit section 32 that mainly comprises the image pickup lens 205 and the AF motor 207 will be described below in detail.

Embodiment 1

Figure 5:
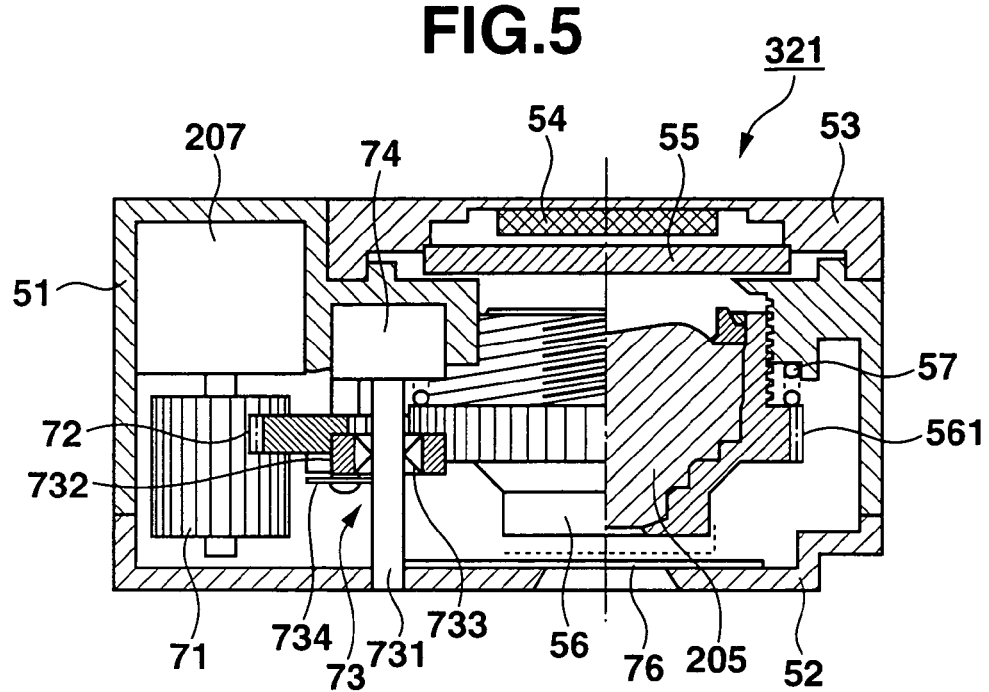
FIG. 5 is a cross-sectional view of a first embodiment of a camera module according to the present invention.
Figure 6:
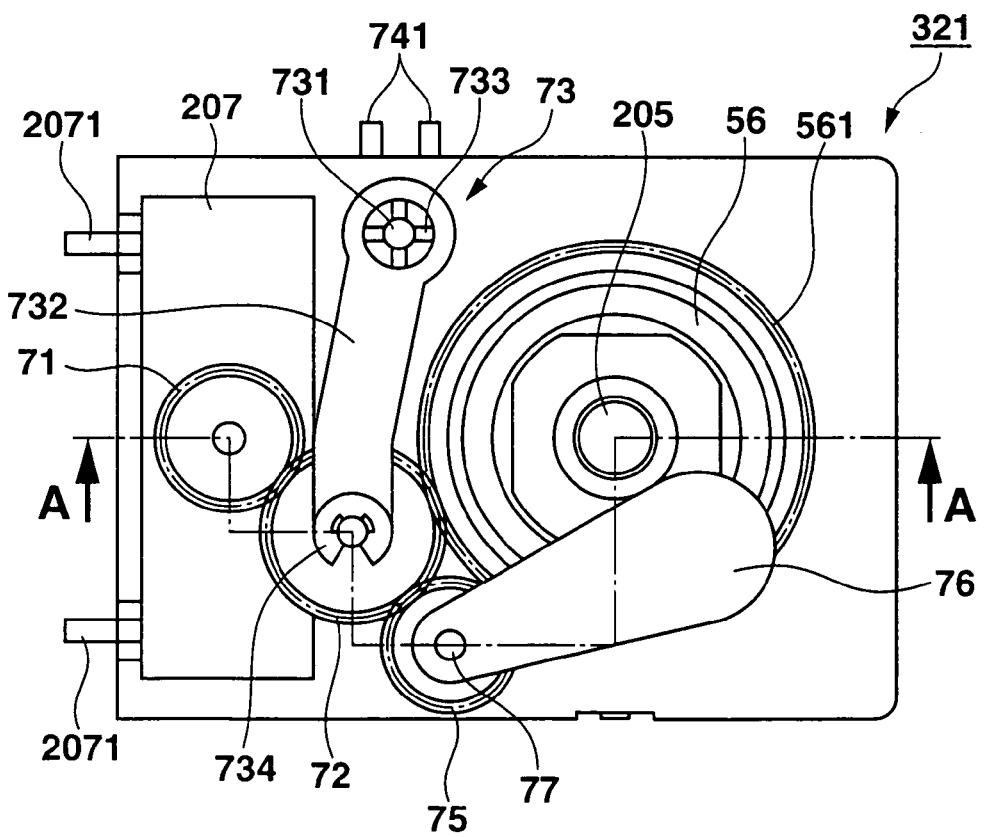
FIG. 6 is a schematic plan view of a gear mechanism, A switching unit and a shutter blade of FIG. 5.
Figure 7:
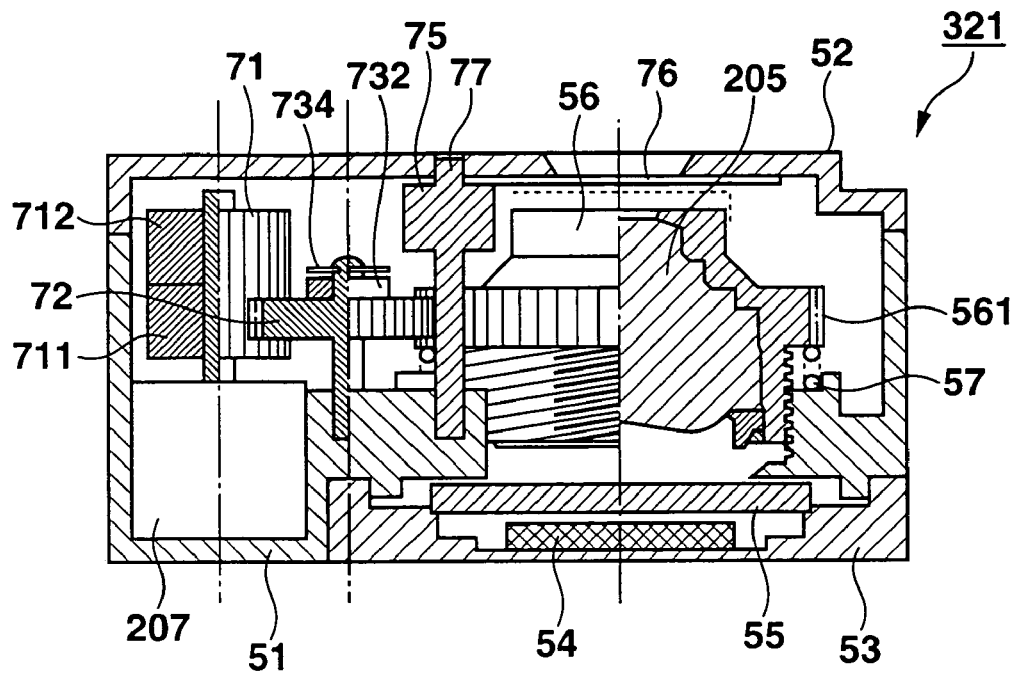
FIG. 7 is a cross-sectional view taken along a line A-A in FIG. 6.

FIGS. 5-7 illustrate an embodiment 1 of the camera module 321 in the present invention. In the camera module 321 of FIG. 5, reference numeral 51 denotes a mount (or case); 52 a cover; 53 a CCD (or image pickup element) sensor package; 54 a CCD sensor; 55 an infrared reflective glass plate; 56 a lens frame; 57 a spring; 71 a drive gear; 72 an AF gear; 73 a switching unit; 74 a piezoelectric element (or drive means); 75 a shutter gear; and 76 a shutter blade.

The CCD sensor package 53 that comprises the CCD sensor 54 and the infrared reflective glass plate 55 is assembled in a recess provided on the outside of the mount 51.

The lens frame 56 with the image pickup lens 205 received therein is incorporated axially extendable within the mount 51 with the AF motor 207 that comprises a step motor also assembled within the mount 51. Reference numeral 2071 denotes a pair of electric power-supply terminals for the motor (FIG. 6).

Within the mount 51, the AF gear 72 is supported rotatably on the mount 51 and can mesh with the drive gear 71 provided on a shaft of the AF motor 207 and also with a gear 561 formed on the outer periphery of the lens frame 56, which is screwed to the mount 51 so as to move axially relative to the mount 51.

The spring 57 is disposed between the gear 561 and the mount 53 to push the lens frame 56 always forwardly such that no backlash is present between the lens frame 56 and the mount 51.

The shutter blade 76 that opens and closes the front of the lens 205 is disposed within the cover 52. The shutter gear 75 selectively meshable with the AF gear 72 is provided integral with a plastic rotational shaft 77 of the shutter blade 76. The shutter blade 76 is fixedly fitted by gluing or thermal fusion over the resin rotational shaft 77 supported rotatably by the mount 51 and the cover 52 on the AF motor 207 side laterally of the lens frame 56.

The switching unit 73 and the drive unit (or piezoelectric element) 74 are used to slightly axially move the AF gear 72 present between the AF motor 207 and the lens frame 56 along with the drive gear 71 meshing with the AF gear 72 so as to mesh with the shutter gear 75 or the gear 561. The switching unit 73 comprises a plastic working shaft 731 that is moved axially by the piezoelectric element 74 provided on the mount 51 and an arm 732 extending between the working shaft 731 and a shaft of the AF gear 72. More specifically, the arm 732 is fitted at one end through the spring 733 to the working shaft 731 so as to rotatable around the shaft 731 and supported at the other end to the shaft of the AF gear 72 through an E-like ring 734 so as to rotatable around the shaft of the AF gear 72.

When a wide pulse voltage is applied across the pair of terminals 741, the piezoelectric element 74 extends and the working shaft 731 moves downward in FIG. 5. Since at this time the arm 732 is strongly pressed against the working shaft 731 by the spring 733, the arm 732 moves downward along with the working shaft 731. That is, since the frictional force acts effectively on the working shaft 731 by the spring 733, the AF gear 72 is moved downward by the arm 732.

When a narrow pulse voltage opposite in polarity to the first-mentioned pulse voltage is applied across the pair of terminals 741, the piezoelectric element 74 shrinks and the arm 732 tries to move upward in FIG. 5. Since the frictional force of the spring 733 acting on the working shaft 731 is low, however, the arm 732 does not move upwards and remains at its position that the arm 732 occupied so far.

As described above, since the AF gear 72 connected to the arm 732 can slightly move axially with the AF gear 72 meshing with the drive gear 71, it can mesh with the gear 561 of the lens frame 56 or the shutter gear 75. When the AF gear 72 meshes with the gear 561 of the lens frame 56, the lens frame 56 screwed to the mount 51 is moved downwards by driving the AF motor 207 in FIG. 5.

When the AF gear 72 meshes with the shutter gear 75 and the AF motor 207 is driven, the shutter blade 76 is turned so as to cover or open the front of the image pickup lens 205. In FIG. 7, the AF gear 72 meshes with one half 711 of the drive gear 71 while meshing with the gear 561 of the lens frame 56. Otherwise, the AF gear 72 meshes with the other half 712 of the drive gear 71 while meshing with the shutter gear 75.

The AF operation and the shutter operation will be described next. As shown in FIG. 6, usually the AF gear 72 is kept meshed with the shutter gear 75 due to control of the pulse voltage applied to the piezoelectric element 74 with the shutter blade 76 open at the front of the image pickup lens 205.

When it is detected that the user has half depressed the camera key 102, a narrow pulse voltage is applied to the piezoelectric element 74, which then shrinks and the working shaft 731 moves away from a plane of FIG. 6. Thus, the AF gear 72 moves away from the shutter gear 75 and then meshes with the gear 561 of the lens frame 56, as shown in FIG. 7.

Then, the AF motor 207 is driven such that the lens frame 56 moves, thereby performing an AF operation from a MICRO position to a longest-focal-length position.

When the camera key 102 is kept half depressed by the user, the same pulse voltage as the first-mentioned pulse voltage is applied to the piezoelectric element 74, thereby causing the piezoelectric element to extend this way in FIG. 6. Thus, the AF gear 72 moves away from the gear 561 with the AF gear 72 meshing with the drive gear 71 and then meshes with the shutter gear 75.

Figure 8:
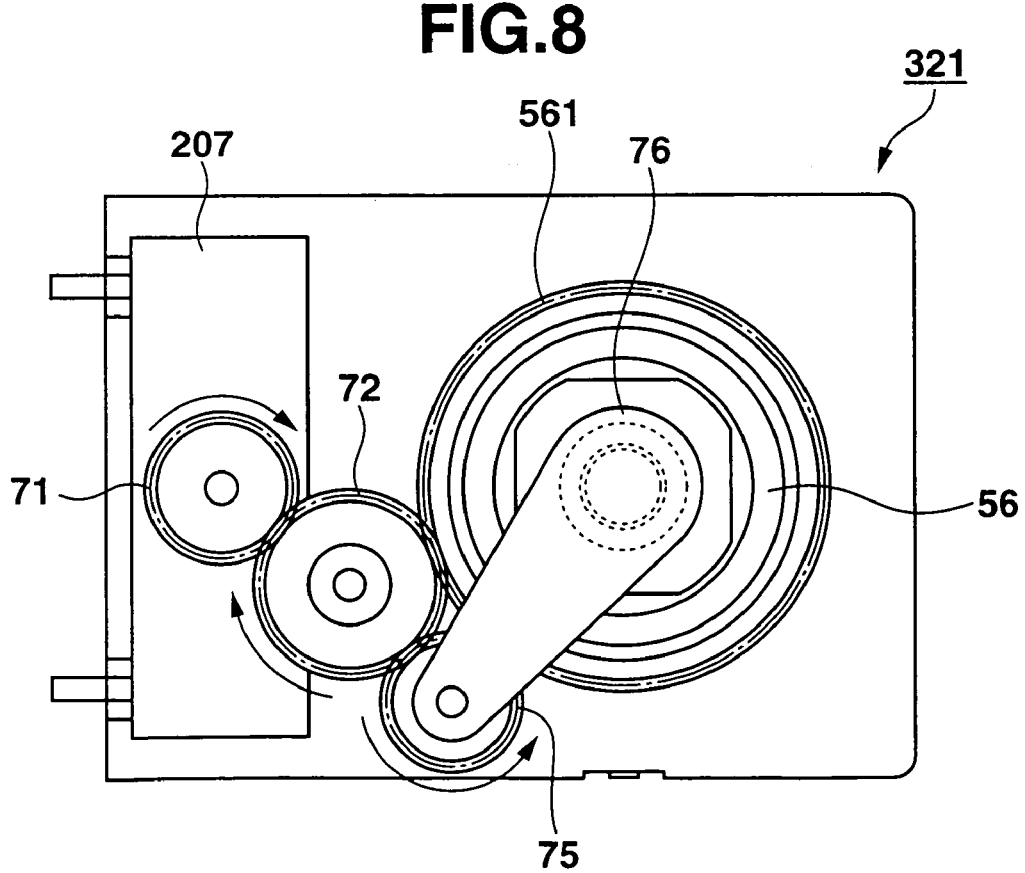
FIG. 8 is a schematic plan view of the gear mechanism and a closed shutter blade of FIG. 6.

When the user then depresses the camera key 102, thereby performing the shutter operation, the rotation of the drive gear 71 of the AF motor 207 shown in FIG. 8 is transmitted to the AF gear 72 and the gear 561 and causes the shutter blade 76 to rotate. Thus, the shutter blade 76 covers the front of the lens 205 temporarily and then the drive gear 71 is driven backwardly. This causes the AF gear 72 and the gear 561 to rotate in directions opposite to those of the respective arrows of FIG. 8. Then, as shown in FIG. 6, the shutter blade 76 returns to a state in which the shutter blade 76 is again open at the front of the lens 205. Simultaneously, rays of light enter into the camera from an object through the lens 205, thereby being focused as an image on the CCD sensor 54, and the image is then captured. The shutter operation may be performed following or without the AF operation.

As described above, in the camera of the mobile telephone of this embodiment, the switching unit 73 that slightly axially moves the AF gear 72 and the drive gear 71 meshing with the AF gear 72, thereby causing the AF gear 72 to selectively mesh with the shutter gear 75, and the piezoelectric element 74 that drives the switching means 73 are illustrated as provided between the AF motor 207 and the lens frame 56. The switching unit 73 has the structure in which the arm 732 extends between the AF gear 72 and the working shaft 731 that is moved axially by the piezoelectric element 74. Thus, by slightly moving the AF gear 72 axially, the shutter blade 76 can be opened/closed. Therefore, the inventive camera module requires none of elements such as the planetary gear mechanism, the engaging lever to hold the planetary gear mechanism at the selected one of the two positions where the planetary gear mechanism engages the respective AE and AF gears selectively, the plunger and core that drive the engaging lever, and the lever returning spring as required in the prior art shutter mechanism.

Thus, the drive gear 71 for the AF motor 207, the gear 561 of the lens frame 56, the shutter gear 75, the AF gear 72, its simple switching unit 73 (including the working shaft 731 and the arm 732) and the piezoelectric element 74 are implemented with high density in a centralized manner. Thus, the camera of the mobile telephone is miniaturized and thinned compared to the prior art ones.

While in this embodiment the AF gear 72 is illustrated as moved axially through the switching unit 73 (including the working shaft 731 and the arm 732) by the operation of the piezoelectric element 74, the AF gear 72 may be moved axially by a small motor (comprising, for example, a step motor).

While the arm 732 is illustrated as attached to the shaft of the AF gear 72 by the E-like ring 734, it may be screwed to an end of the shaft of the AF gear 72 with a raised area formed on the AF gear 72 around the shaft of the AF gear 72 between the AF gear 72 and the arm 732 such that the AF gear 72 can rotate around the shaft of the AF gear 72.

Embodiment 2

Figure 9:
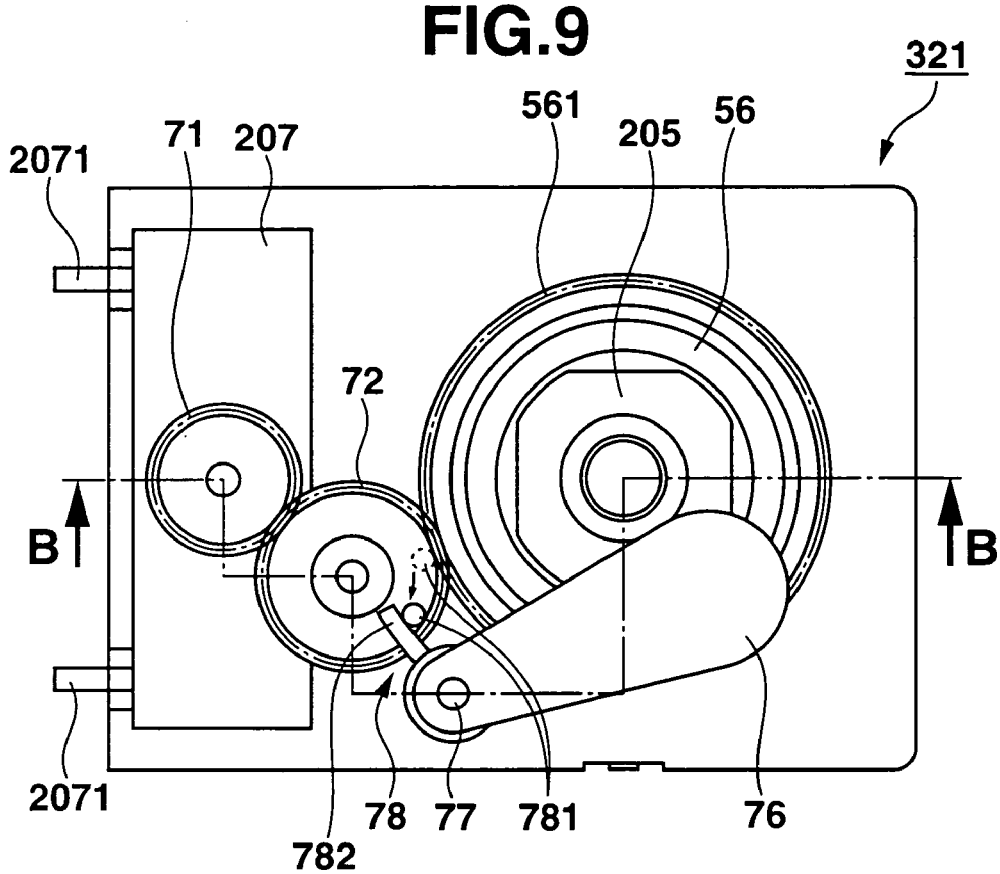
FIG. 9 is a schematic plan view of a second embodiment of the camera module according to the present invention.
Figure 10:
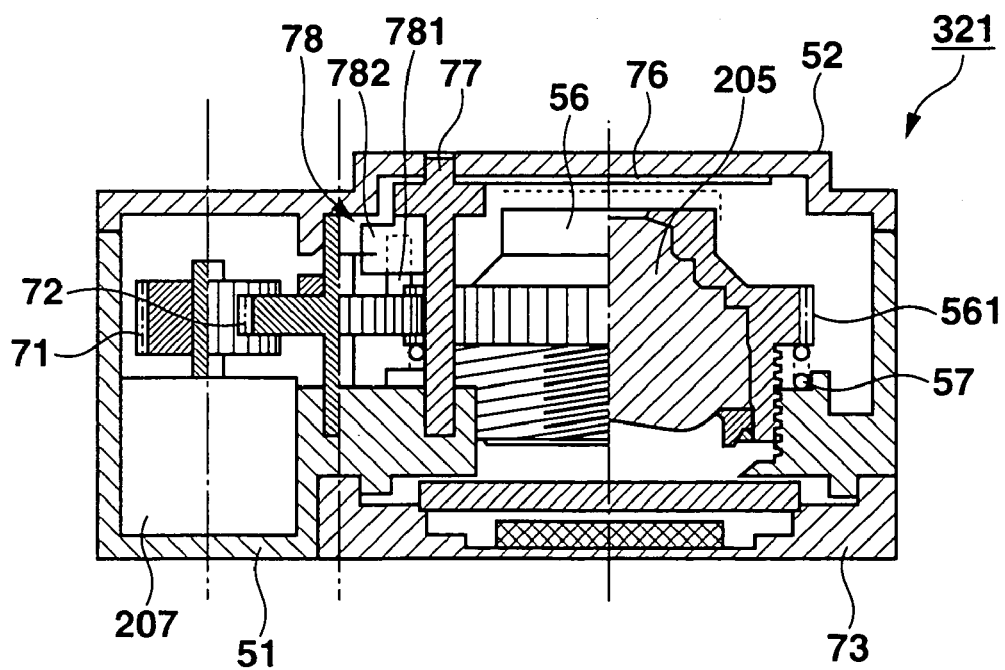
FIG. 10 is a cross-sectional view taken along a line B-B in FIG. 9.

FIGS. 9 and 10 illustrate an essential portion of an embodiment 2 of the camera module 321 according to the present invention. In FIGS. 9 and 10, reference numeral 78 denotes an engaging unit. Other members and parts of the camera module similar to those of the first embodiment are given the same reference numerals as those used for the members and parts of the camera module of the first embodiment. In the embodiment 2, an engaging unit 78 is provided between the AF gear 72 and the rotational shaft 77 of the shutter blade 76 instead of the switching unit 73 (including the working shaft 731 and the arm 732) of the embodiment 1. As shown, the engaging unit 78 comprises an engaging pin 781 integral with a surface of the AF gear 72, and an engaging member 782 integral with the rotational shaft 77 of the shutter blade 76 extending radially outwards from the shaft 77.

The pin 781 does not come into contact with the engaging member 782 in a usual image pickup range (from the MACRO position to the longest-focal-length position) in which the lens frame 56 moves, and remains at a position shown by broken lines. When the lens frame 56 moves beyond the longest-focal-length position out of the image pickup range, the pin 781 comes into contact with the engaging member 782.

Figure 11:
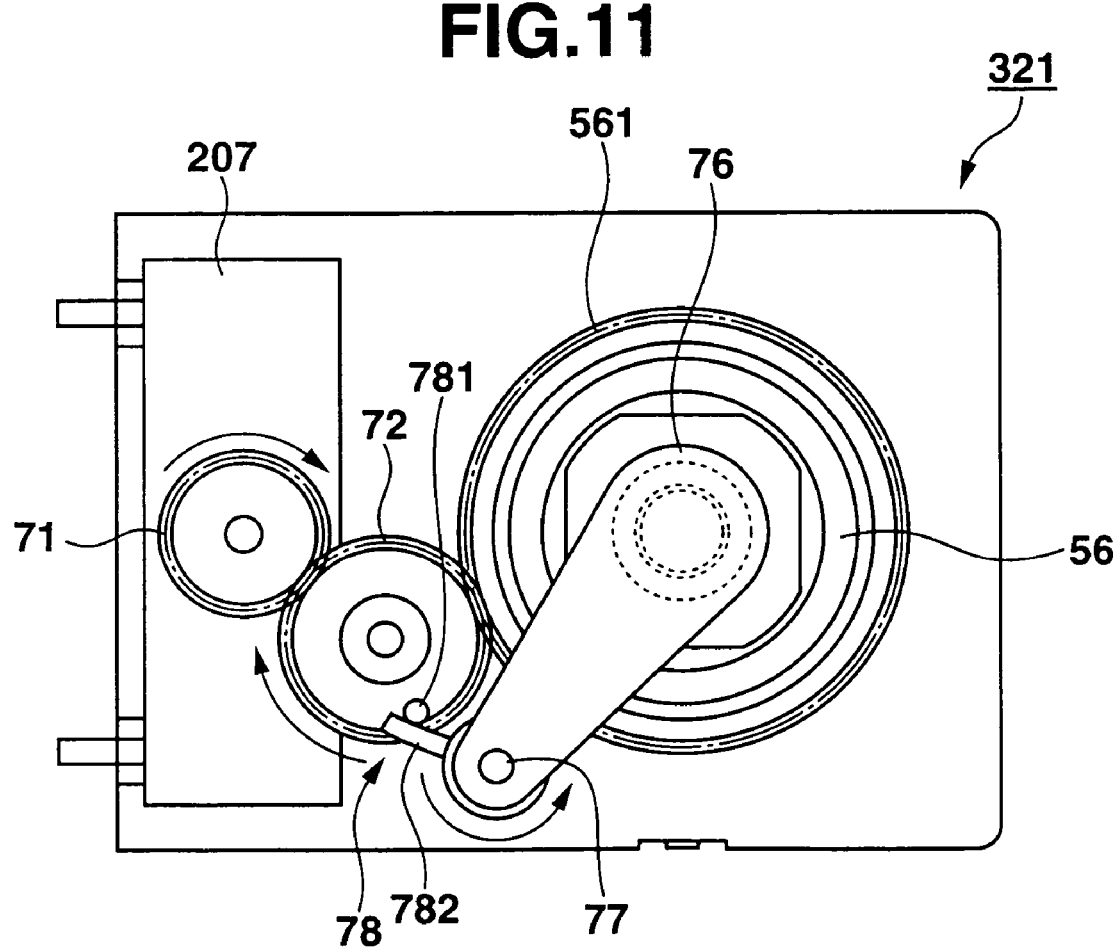
FIG. 11 is a schematic plan view of the second embodiment where the shutter blade is closed due to the pin engaging the plate in FIG. 9.

The shutter blade 76 is normally held by the flexibility of a spring (not shown) so that the image pickup lens 205 appears. Only when the engaging member 782 is pushed by the pin 781, the shutter 76 is closed and hence the image pickup lens 205 is covered, as shown in FIG. 11. When the shutter blade 76 covers the front of the lens 205, the lens frame 56 moves towards the CCD sensor 54. Thus, the shutter blade 76 does not interfere with the lens frame 56.

The AF operation of this embodiment is similar to that described with reference to the embodiment 1 and further description thereof will be omitted. The shutter operation of this embodiment will be described next. In this embodiment, the shutter operation is performed when no AF operation is performed, or when the lens frame 56 has moved towards the CCD sensor 54 beyond the longest-focal-length position. When the shutter operation is performed, for example, with the camera key 102 of the mobile telephone, the drive gear 71 of the AF motor 207 is driven with the lens frame 56 moved toward the CCD sensor 54, and the AF gear 72 is rotated in the direction of an arrow in FIG. 11.

This causes the pin 781 to push the engaging member 782, thereby rotating the rotational shaft 77 in the direction of an arrow shown. Thus, the shutter blade 76 is rotated, thereby covering the front of the image pickup lens 205 temporarily. Then, the drive gear 71 is driven in the backward direction and the AF gear 72 and the gear 561 are rotated in a direction reverse to that shown in FIG. 11. Then, the shutter blade 76 opens at the front of the image pickup lens 205, as shown in FIG. 9.

While in this embodiment the present invention is illustrated as applied to the folding mobile telephones, the present invention may be applicable to other mobile communication devices, electronic devices and digital cameras.

While in the embodiments the coil spring was illustrated as used to push the lens frame up, a leaf spring may be used instead for the same purpose.

Various modifications and changes may be made thereunto without departing from the broad spirit and scope of this invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2004-35123 filed on Feb. 12, 2004 and including specification, claims, drawings and summary. The disclosure of the above Japanese patent application is incorporated herein by reference in its entirety.

What is claimed is:

1. An image pickup apparatus comprising:
    an image pickup element;
    a lens for focusing an image of an object onto the image pickup element;
    a lens moving member for moving the lens;
    a lens covering member for covering the lens;
    a covering-member moving member for moving the lens covering member;

a driver;

a transmission member provided between the lens and the driver for engaging one of the lens moving member and the covering-member moving member to transmit power from the driver to the lens moving member or the covering-member moving member; and a switching unit for controlling the transmission member to selectively engage one of the lens moving member and the covering-member moving member, wherein the lens moving member comprises a first gear provided around a periphery thereof;

wherein the covering-member moving member comprises a second gear that is rotatable around an axis parallel to a rotational shaft of the first gear;

wherein the transmission member comprises a third gear for engaging one of the first gear and the second gear; and wherein the switching unit controls the third gear to selectively engage one of the first gear and the second gear.

2. The image pickup apparatus of claim 1, wherein:

the transmission member comprises a piezoelectric element and a terminal through which an electric signal is applied to the piezoelectric element, thereby causing the piezoelectric element to extend and contract, and the third gear is moved in response to the extension and contraction of the piezoelectric element to control the third gear to engage one of the first gear and the second gear.

3. The image pickup apparatus of claim 1, wherein:

the driver comprises a driving motor having a fourth gear which is attached to a motor axis and which is engaged with the third gear, and the third gear is movable in a direction parallel to the rotational shaft of the first gear, while maintaining engagement with the fourth gear, so as to engage one of the first gear and the second gear.

4. A camera module comprising:

an image pickup element;

a lens for focusing an image of an object onto the image pickup element;

a lens moving member for moving the lens;

a lens covering member for covering the lens;

a covering-member moving member for moving the lens covering member;

a driver;

a transmission member provided between the lens and the driver for engaging one of the lens moving member and the covering-member moving member to transmit power from the driver to the lens moving member or the covering-member moving member; and a switching unit for controlling the transmission member to selectively engage one of the lens moving member and the covering-member moving member, wherein the lens moving member comprises a first gear provided around a periphery thereof;

wherein the covering-member moving member comprises a second gear that is rotatable around an axis parallel to a rotational shaft of the first gear;

wherein the transmission member comprises a third gear for engaging one of the first gear and the second gear; and wherein the switching unit controls the third gear to selectively engage one of the first gear and the second gear.

5. The camera module of claim 4, wherein:

the transmission member comprises a piezoelectric element and a terminal through which an electric signal is applied to the piezoelectric element, thereby causing the piezoelectric element to extend and contract, and the third gear is moved in response to the extension and contraction of the piezoelectric element to control the third gear to engage one of the first gear and the second gear.

6. The image pickup apparatus of claim 4, wherein the driver comprises a driving motor having a fourth gear which is attached to a motor axis and which is engaged with the third gear, and the third gear is movable in a direction parallel to the rotational shaft of the first gear, while maintaining engagement with the fourth gear, so as to engage one of the first gear and the second gear.

* * * * *